J. L. PHILLIPS.
Road-Wagon.
No. 216,697. Patented June 17, 1879.
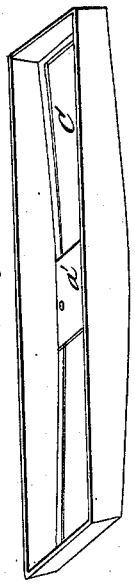
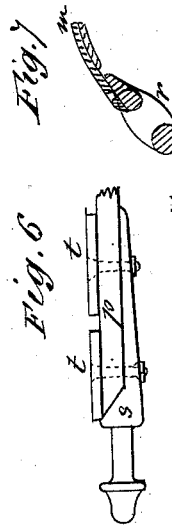
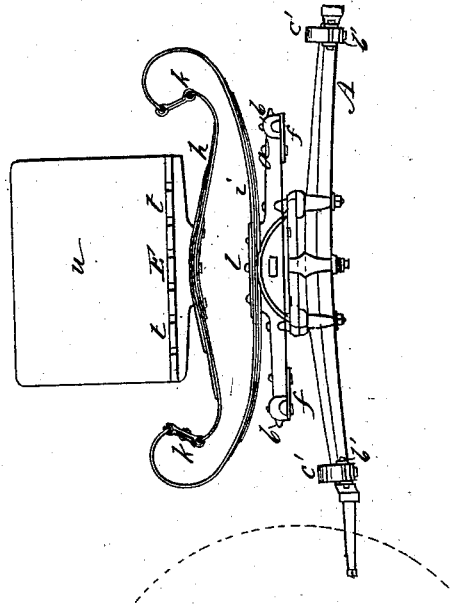
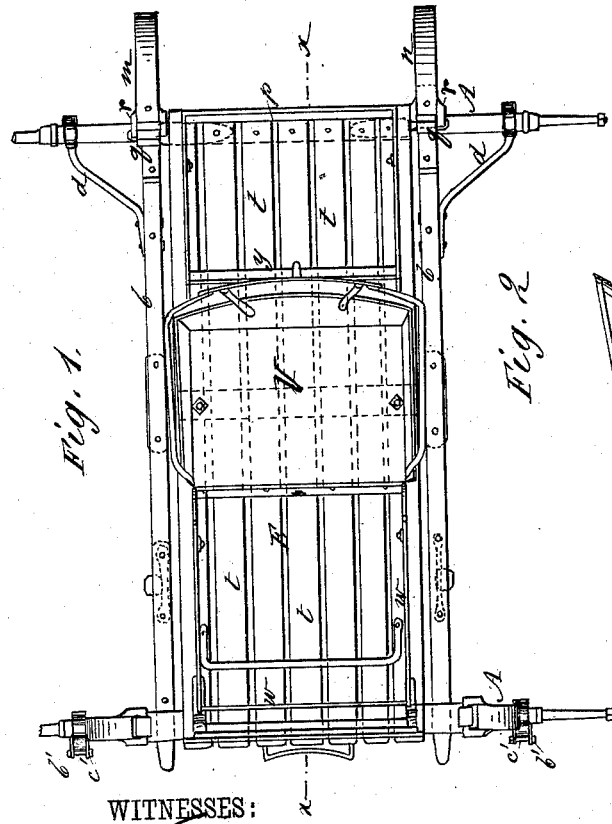
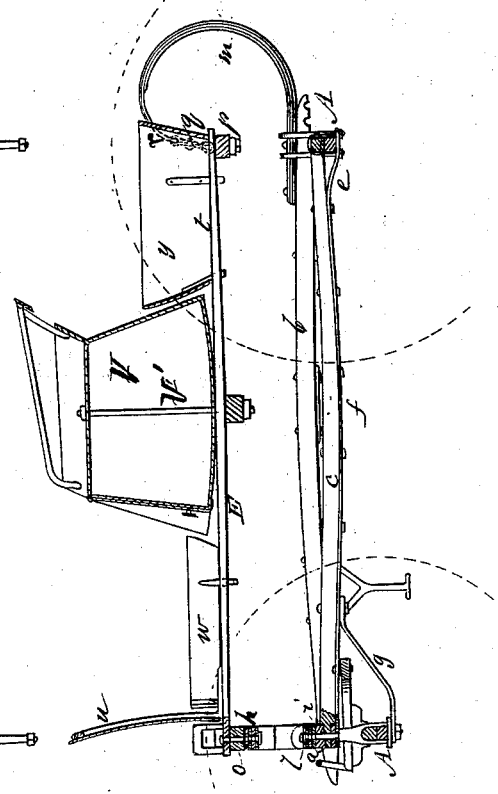
WITNESSES:
C. Neveux
C. Sedgwick
INVENTOR:
J. S. Phillips
BY Munn & Co.
ATTORNEYS.

UNITED STATES PATENT OFFICE.

JAMES L. PHILLIPS, OF LOWVILLE, NEW YORK.

IMPROVEMENT IN ROAD-WAGONS.

Specification forming part of Letters Patent No. 216,697, dated June 17, 1879; application filed January 25, 1879.

*To all whom it may concern:*

Be it known that I, JAMES L. PHILLIPS, of Lowville, in the county of Lewis and State of New York, have invented new and useful Improvements in Road-Wagons, of which the following is a specification.

The object of this invention is to construct a vehicle having the combined characteristics of a light road-wagon or buggy, adjustable according to the work to be done, and having its joints constructed so as not to rattle.

The invention consists in certain novel features of construction, hereinafter described, and shown in the accompanying drawings.

In the drawings, Figure 1 is a plan view of the wagon. Fig. 2 is a section on line $x\ x$ of Fig. 1. Fig. 3 is a front elevation. Figs. 4 and 5 are perspective views of boxes adapted for use with the wagon. Fig. 6 is an elevation, in larger size, of the tip-piece for the shackle that connects the spring and platform. Fig. 7 is a section of the loop-piece for the shackle at the end of the spring.

Similar letters of reference indicate corresponding parts.

A A are the front and rear axles and bed-pieces of the vehicle. Upon the front axle is the head-block $a$, which is connected by the two longitudinal side bars, $b\ b$, and curved central reach, $c$, to the rear axle, which parts retain the axles in position. To strengthen the attachment of bars $b$ and reach $c$, there are braces $d$ from bars $b$ to rear axle, A, and braces $e$ from axle A to bars $b$ and reach $c$, which braces are secured by clips and bolts.

The side bars and reach are further strengthened by plates $f f$ at the under side and by king-bolt brace $g$.

Upon head-block $a$ is a spring, $i$, of cradle or semi-elliptic form, secured by bolts passing through head-block $a$. Upon spring $i$ is a spring, $h$, of semi-elliptic form. The ends of springs $h$ are connected to $i$ by leather or metal shackles $k$.

$l$ is the king-bolt, that passes through spring $i$ and block $a$ and outside of axle A and bed-piece, and carrying the fifth-wheel, as usual.

The rear springs, $m\ n$, which are of semi-circular or elliptic form, are connected by bolts and clips to the side bars, $b$. The springs $h\ i$ support the cross-bar $o$, that is attached to $h$ by bolts and screws; and the rear springs, $m\ n$, support the spring cross-bar $p$ by shackles $q$, that depend from the ends of springs $m\ n$.

The loop-piece for connection of the shackles $q$ to the springs is formed in a separate piece, $r$, as seen in Fig. 7, and connected to the spring by a bolt or rivet.

By this construction there are no loose parts to rattle and a stronger connection may be made.

To connect the shackles $q$ to the cross-bar $p$, I make use of metal tips $s$, (see Fig. 6,) that extend beneath bar $p$ at either end, and are secured thereto by bolts and nuts. The outer ends of these tip-pieces $s$ are formed with a head for retaining the shackles in place.

The platform E of the wagon consists of spring-slats $t$, that extend from the forward cross-bar, $o$, to the rear spring-bar, $p$, and are retained in place by bolts passing through $o$ and $p$. These slats $t$ are thinned down from the center toward each end, and form a very pliant and elastic platform for the wagon. The dash-board $u$ is attached at the forward end.

The slatted platform carries the shifting seat and boxes, which can be changed or adjusted according to the purposes for which the wagon is to be used.

In Figs. 1 and 2, the seat V is shown attached by bolts V' passing through the seat and slats $t$. This seat is formed as a tight box with a curved bottom, that conforms to the curve of the slats as they bend.

A frame, $w$, is attached in the same manner in front of the seat, forming side pieces; and behind the seat a box, $y$, is connected, which forms a convenient receptacle for trunks or other freight.

In this form the wagon retains all its elasticity and answers the purposes of a buggy.

Fig. 4 shows a piano-box, C, which may be attached in place of the frame $w$ and box $y$. This box C has a cross-piece, $a'$, having holes, through which the bolts connecting the seat will pass, so that the same bolts connect the seat and box C to the spring-platform.

The side pieces of box C are curved at their bottom edge, so as to permit the slats to spring when the box is in place.

In this form the wagon retains all its elastic features, and is adapted for the purposes of a light spring-wagon.

When more stiffness is required in the slatted platform, the piano-box D, Fig. 5, will be attached in the same manner. This having its sides straight at the bottom lies flat upon the slats, so that they will not be as pliable as before.

The thill-couplings $b'$ on the forward axle A are fitted with plate-springs $c'$, that prevent rattling of the shafts.

By the above-described construction the wagon is rendered easy-riding and convenient for use. It is strong and durable in every part, and will not rattle at the joints. It is adapted for heavy and rough roads, and as a vehicle for pleasure riding or for work.

Having thus described my invention, I claim as new and desire to secure by Letters Patent—

1. The head-block $a$, connected by two longitudinal side bars, $b$, and curved central reach, $c$, with the rear axle, in combination with the springs $h\ i$, connected by shackles $k$, the king-bolt $l$, the rear springs, $m\ n$, connected with side bars, $b$, the elastic cross-bar $p$, the shackles $q$, loop-piece $r$, and the platform E of spring-slats, as shown and described.

2. The loop-piece $r$, made in one separate piece for connection with shackle, and attached to spring by bolt or rivet, as set forth.

3. The tip-pieces $s$, formed with a head for retaining the shackles, as shown and described.

JAMES L. PHILLIPS.

Witnesses:
GEO. D. WALKER,
C. SEDGWICK.